United States Patent
King et al.

(10) Patent No.: US 7,243,965 B2
(45) Date of Patent: Jul. 17, 2007

(54) CONVERTIBLE CAMPER SHELL AND HARD TONNEAU

(75) Inventors: James King, Rich Hill, MO (US); James Skocy, Rich Hill, MO (US)

(73) Assignee: Woodworth Investment Group LLC, Little Rock, AR (US)

( * ) Notice: Subject to any disclaimer, the term of this patent is extended or adjusted under 35 U.S.C. 154(b) by 0 days.

(21) Appl. No.: 11/183,497

(22) Filed: Jul. 18, 2005

(65) Prior Publication Data

US 2006/0066130 A1  Mar. 30, 2006

Related U.S. Application Data (60) Provisional application No. 60/588,476, filed on Jul. 16, 2004.

(51) Int. Cl.
*B60P 3/34* (2006.01)

(52) U.S. Cl. ............... 296/26.07; 296/26.04; 296/26.06; 296/164

(58) Field of Classification Search ............. 296/26.01, 296/26.02, 26.04, 26.06, 26.07, 165, 136.01, 296/136.03, 136.05, 100.08, 100.1, 173, 296/164, 37.6

See application file for complete search history.

(56) References Cited

U.S. PATENT DOCUMENTS

| | | | |
|---|---|---|---|
| 3,155,423 A | 11/1964 | Cripe | |
| 3,690,719 A * | 9/1972 | Yount | 296/164 |
| 3,709,551 A * | 1/1973 | McCarthy | 296/170 |
| 3,762,762 A | 10/1973 | Beveridge et al. | |
| 3,923,334 A | 12/1975 | Key | |
| 4,083,596 A | 4/1978 | Robertson | |
| 4,101,162 A | 7/1978 | Koehn | |
| 4,659,136 A * | 4/1987 | Martin et al. | 296/100.04 |
| 4,756,571 A | 7/1988 | Lake | |
| 4,768,824 A * | 9/1988 | Andonian | 296/165 |
| 5,056,855 A * | 10/1991 | Moravsky | 296/98 |
| 5,104,175 A | 4/1992 | Enninga | |
| 5,207,470 A * | 5/1993 | Rafi-Zadeh | 296/37.7 |
| 5,443,295 A * | 8/1995 | Moberly | 296/105 |
| 5,449,212 A * | 9/1995 | Seifert | 296/57.1 |
| 5,951,095 A * | 9/1999 | Herndon | 296/165 |
| 6,149,217 A * | 11/2000 | Plamondon | 296/10 |
| 6,224,140 B1 | 5/2001 | Hoplock | |
| 6,428,079 B1 * | 8/2002 | Van Dyke | 296/100.06 |
| 6,435,594 B1 * | 8/2002 | Ekonen et al. | 296/100.09 |
| 6,467,830 B1 * | 10/2002 | Cortright | 296/37.6 |
| 6,508,705 B1 * | 1/2003 | Van Overschelde | 460/23 |
| 6,663,160 B2 * | 12/2003 | Yarbrough et al. | 296/100.06 |
| 6,820,915 B2 * | 11/2004 | Mack et al. | 296/100.08 |
| 6,929,303 B1 * | 8/2005 | Sharples | 296/37.6 |
| 2004/0061351 A1 | 4/2004 | Angelos | |
| 2006/0119124 A1 * | 6/2006 | Briggs | 296/26.06 |

* cited by examiner

*Primary Examiner*—D. Glenn Dayoan
*Assistant Examiner*—G Blankenship
(74) *Attorney, Agent, or Firm*—Shughart Thomson & Kilroy PC (57) ABSTRACT

A truck bed camper shell and hard tonneau cover device is provided which is activated for movement between a raised truck bed camper shell position and a lowered hard tonneau cover position by remote activation of actuators such as pneumatics or hydraulic cylinders or a screw drive mechanism.

25 Claims, 7 Drawing Sheets

CONVERTIBLE CAMPER SHELL AND HARD TONNEAU

CLAIM OF PRIORITY

This application claims priority to U.S. Provisional Application Ser. No. 60/588,476 filed Jul. 16, 2004.

BACKGROUND OF THE INVENTION

The present invention relates to pickup truck bed covers and, more particularly, to such a cover which is convertible between a camper type shell and a hard tonneau type cover.

The beds of pickup trucks enable a wide variety of items to be hauled by such trucks. One problem with pickup beds is their open nature which makes items carried vulnerable to weather damage, theft, or loss by falling or being blown out of the bed. Earlier soft tonneau covers snapped onto snap fasteners mounted on top of the side walls, a front end wall, and the tailgate and provided a cover for the bed which could be opened as needed to place articles into the bed or take them out. More recently, so-called hard tonneau covers have been developed which incorporate mechanisms that allow the cover to tilt up about the front end to provide access to the bed. Some hard tonneau covers are powered by electrical motors, hydraulic cylinders, or pneumatic cylinders to lift and lower the rear end of the cover.

In addition to tonneau covers, various types of shells have been provided for pickup truck beds. Full sized pickup bed camper units are often taller than the pickup cab and wider and longer than the pickup bed and are enclosed by walls on all sides. In contrast, shells, or camper shells, usually are formed of side walls, a front end wall, and a rear hatch, all with windows, and a roof. The rear hatch can be pivoted open or locked closed. Usually, shells have about the same height as the cab and about the same width and length as the pickup bed. Shells allow a person to climb completely into the covered bed and are sometimes used as sleeping quarters when camping. Mechanisms have been developed to tilt shells up about the front end in a manner similar to hard tonneau covers.

In order to combine the advantages of tonneau covers and shells, arrangements have been developed which provide for conversion between a tonneau configuration and a shell configuration. Such an arrangement is disclosed in U.S. Pub. No. 2004/0061351 A1.

SUMMARY OF THE INVENTION

The present invention provides a pickup truck bed cover mechanism which is convertible between a camper shell and a hard tonneau cover. The cover mechanism includes opposite side panels, a rear hatch, and a roof which are interconnected and provided with actuator components in such a manner as to enable the side panels and rear hatch to be retracted inwardly thereby lowering the roof to form a hard tonneau cover for the pickup bed. The side panels and the rear hatch may be provided with transparent or tinted window panes. The roof panel may also be provided with a window. In a preferred embodiment, a pickup cab extension frame is positioned at the front end of the bed and provided with a transparent panel for rearward visibility. Inner surfaces of the extension frame have weather seals which are engaged by the side panels and roof when they are extended to the shell configuration. The mechanism could alternatively incorporate a front panel which is retracted in a manner similar to the rear hatch.

The mechanism includes a U-shaped base frame formed by a front end member and a pair of transversely spaced side members which are secured to the upper ends of the pickup bed side walls. The side panels of the cover are connected to the side members by hinges. Extendible motors such as hydraulic cylinders are pivotally connected between extensions depending from the side members and upper ends of the cover side panels. The roof panel has front and rear sets of left and right transverse guide rails and a center guide rail. Each side panel has a front guide follower and a rear guide follower, which are slidingly engaged respectively with an associated pair of a front and rear transverse guide rails and pivotally connected to the associated side panel.

The center guide rail is part of a centralizing or centering linkage assembly for the cover mechanism as a whole to maintain it in a desired lateral alignment with the pickup bed. The centering mechanism includes pairs of front centering links and rear centering links. The front centering links are pivotally connected to a front centering slide engaged with the center guide rail and to the left and right front guide followers. Similarly, the rear centering links are pivotally connected to a rear centering slide engaged with the center guide rail and to left and right rear guide followers.

The rear hatch is positioned in a flat rear hatch frame which is hinged at its upper end near the rear edge of the roof panel. A hydraulic cylinder, or a left and right pair, is pivotally connected between the hatch frame and the roof panel and operable to pivot the hatch frame up just below the lower surface of the roof panel when the cover mechanism assumes the tonneau configuration. The rear hatch is pivotally connected to the hatch frame and has a lock mechanism so that it can be opened and closed and also locked.

From the shell configuration, the cover mechanism can be retracted to the tonneau configuration. First, the rear hatch frame is retracted into parallel relation below the roof panel. The side panel cylinders are retracted to pivot the side panels about the side frame members, down and inwardly. The guide followers ride along the transverse guide rails, pulling the roof panel down toward the pickup bed. The centering mechanism retains the cover mechanism centered over the bed. Once the cover mechanism has been completely retracted, access to the pickup bed can be gained by use of the pickup tailgate.

From the tonneau configuration, the cover mechanism can be extended to the shell configuration by reversing the steps described above. Specifically, the side panel cylinders are extended to pivot the side panels up and outwardly, thereby raising the roof panel by way of the transverse guide rails and followers. When the roof panel has been fully raised, the rear hatch frame is lowered into place above the tailgate.

DESCRIPTION OF THE FIGURES

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for patent claims and as a representative basis for teaching one skilled in the art to variously employ the present invention in virtually any appropriately detailed structure.

Figure 9:
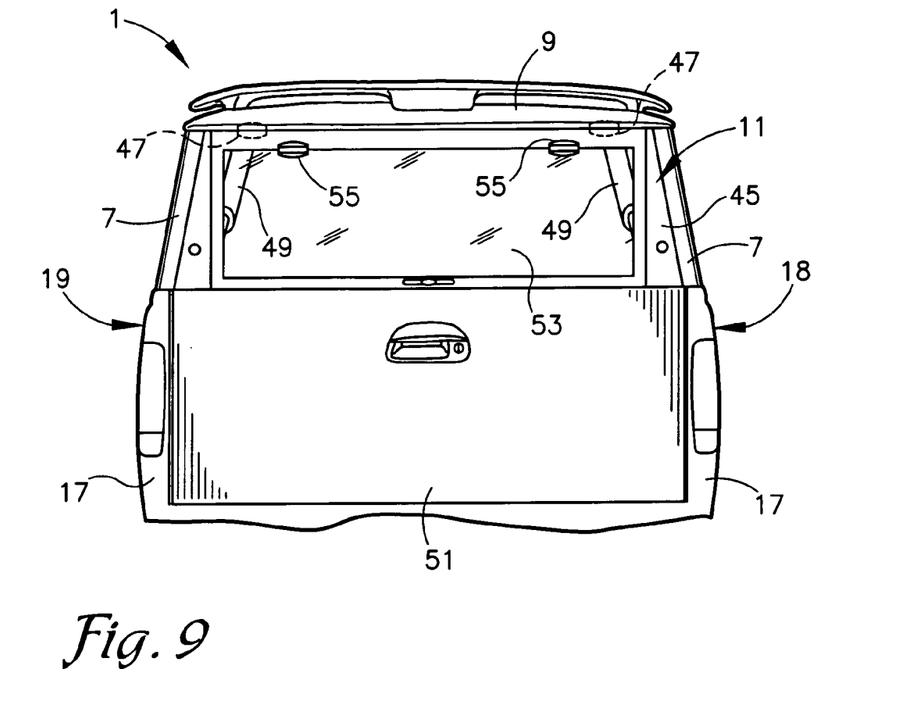
FIG. 9 is a fragmentary diagrammatic rear elevational view of the cover mechanism and illustrates details of a rear hatch of the mechanism.

Referring to the figures in more detail, the reference numeral 1 generally designates a convertible pickup truck bed cover mechanism which embodies the present invention. The cover mechanism 1 generally includes a mounting frame 3 including a pickup cab extension 5, a pair of transversely spaced side panels 7, a roof panel 9, and a rear hatch assembly 11 (FIG. 9). The side panels 7 and rear hatch assembly 11 are interconnected to the roof panel 9 in such a manner that the cover mechanism 1 can converted between a shell configuration (FIG. 1) and a tonneau configuration (FIG. 2).

Figure 1:
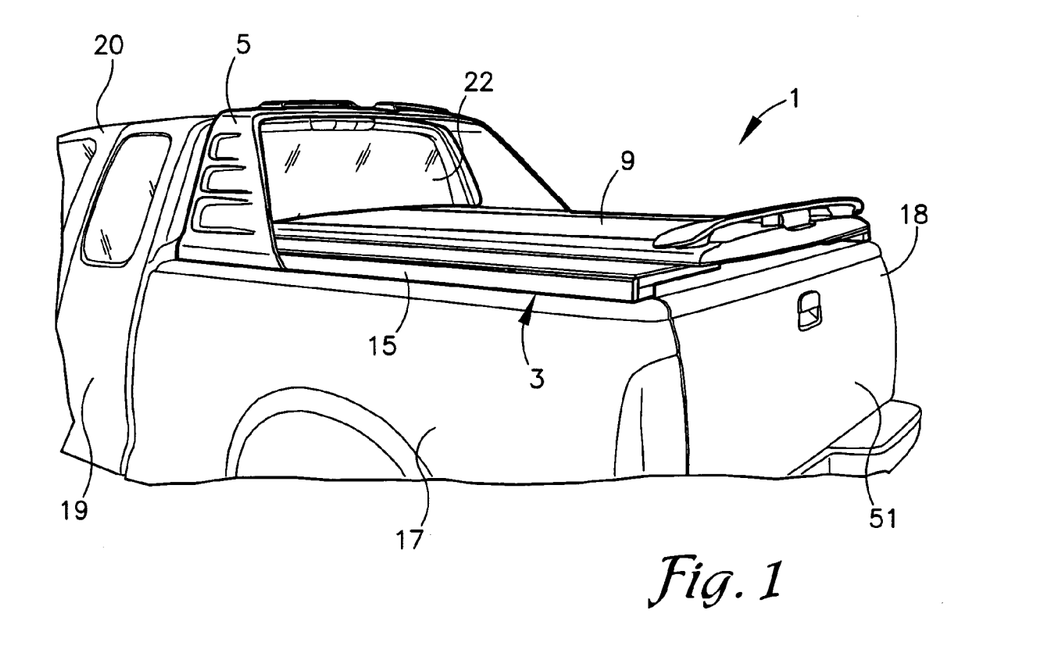
FIG. 1 is a fragmentary side perspective view of a pickup truck incorporating a convertible pickup truck bed cover mechanism which embodies the present invention, with the cover mechanism shown in a retracted tonneau configuration.
Figure 2:
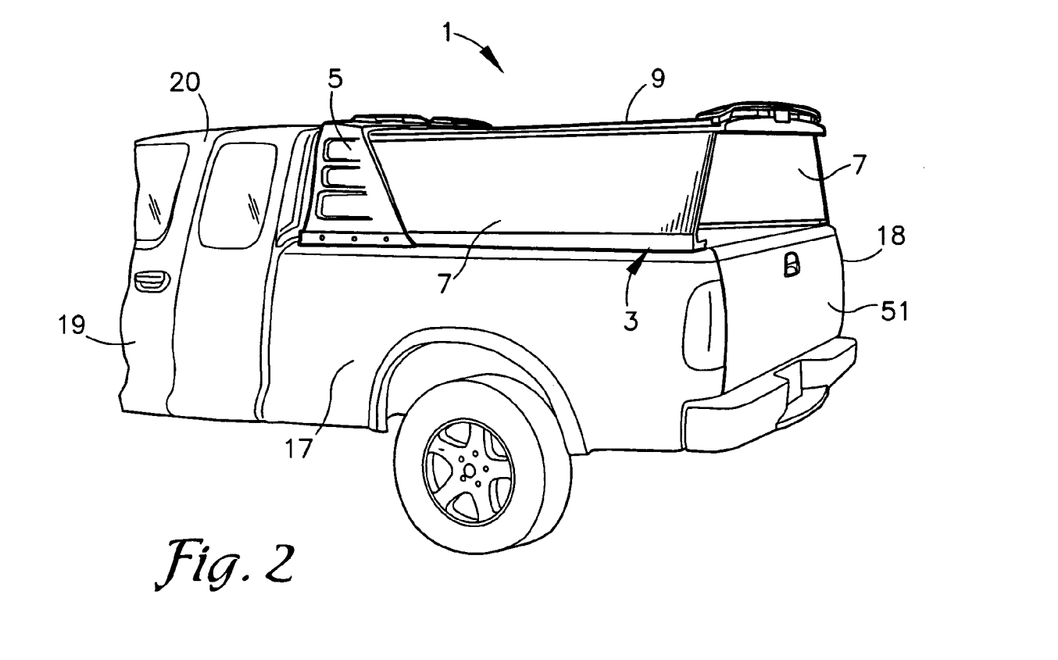
FIG. 2 is a view similar to FIG. 1 and shows the cover mechanism in an extended shell configuration.
Figures 3, 4:
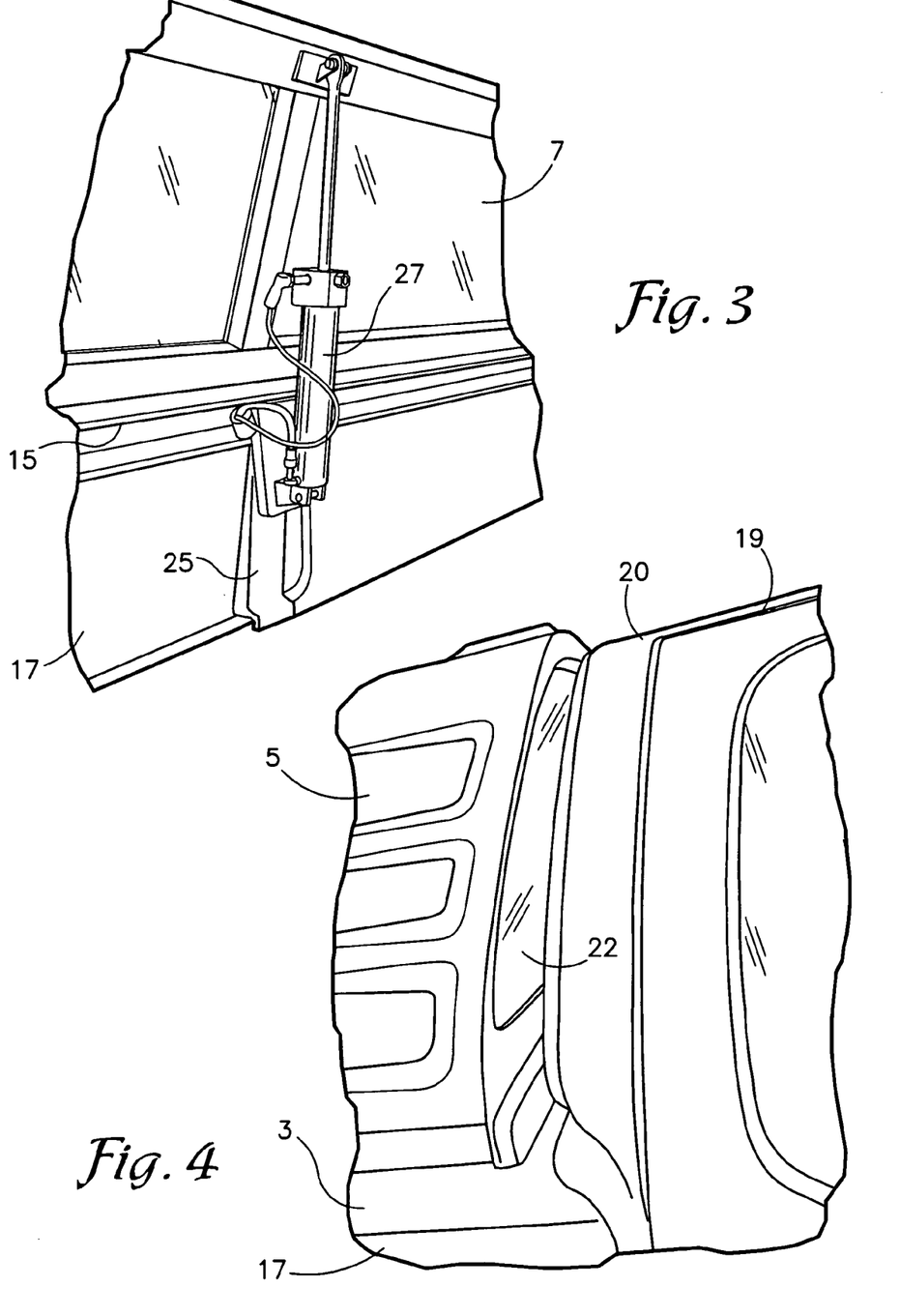
FIG. 3 is a fragmentary perspective view of the inside of a left side panel and illustrates details of a hydraulic actuator of the mechanism.
FIG. 4 is an enlarged fragmentary perspective view showing a cab extender of the cover mechanism which incorporates a fixed window pane.

Referring to FIGS. 1 and 2, the mounting frame 3 includes side frame members 15 which extend rearward from the cab extension 5 to form a U-shaped frame. The side members 15 are parallel and spaced apart to engage upper edges for the side walls 17 of a bed 18 of a pickup truck 19. The side members 15 are preferably fastened to the side walls 17, as by bolts, clamps, or the like. The cab extension 5 is a vertically oriented U-shaped framework with a height comparable to the height of the cab 20 of the pickup 19. The illustrated cab extension 5 frames a front shell window 22 (FIG. 4), and internal surfaces of the cab extension 5 are provided with weather seals (not shown). The weather seals are engaged by the roof panel 9 and side panels 7 in the shell configuration of the cover mechanism 1 for weatherproofing when in the shell configuration. The front window 22 is fixed in place within the cab extension 5. Alternatively, a front window for the cover mechanism could be pivotally connected to the roof panel 9 and retracted in a manner similar to the rear hatch assembly 11, as will be described below. The so-called cab extension 5 does not actually extend or expand the cab 20 of the truck 19. It merely has the appearance of an extension of the cab 20.

The side panels 7 are pivotally connected to the side members 15 by hinges (not shown) so that the side panels 7 can pivot from a somewhat vertical orientation in the shell configuration to substantially horizontal orientation in the tonneau configuration. Each of the side members 15 is provided with a depending extension 25 (FIG. 3) to which a hydraulic side panel actuating cylinder 27 is pivotally connected. An opposite end of the cylinder 27 is pivotally connected to the side panel 7. Retraction of the cylinders 27 pivots the side panels 7 down and toward the center of the bed 18, while extension of the cylinders 27 pivots the side panels 7 up and away from the center of the bed 18.

Figure 5:
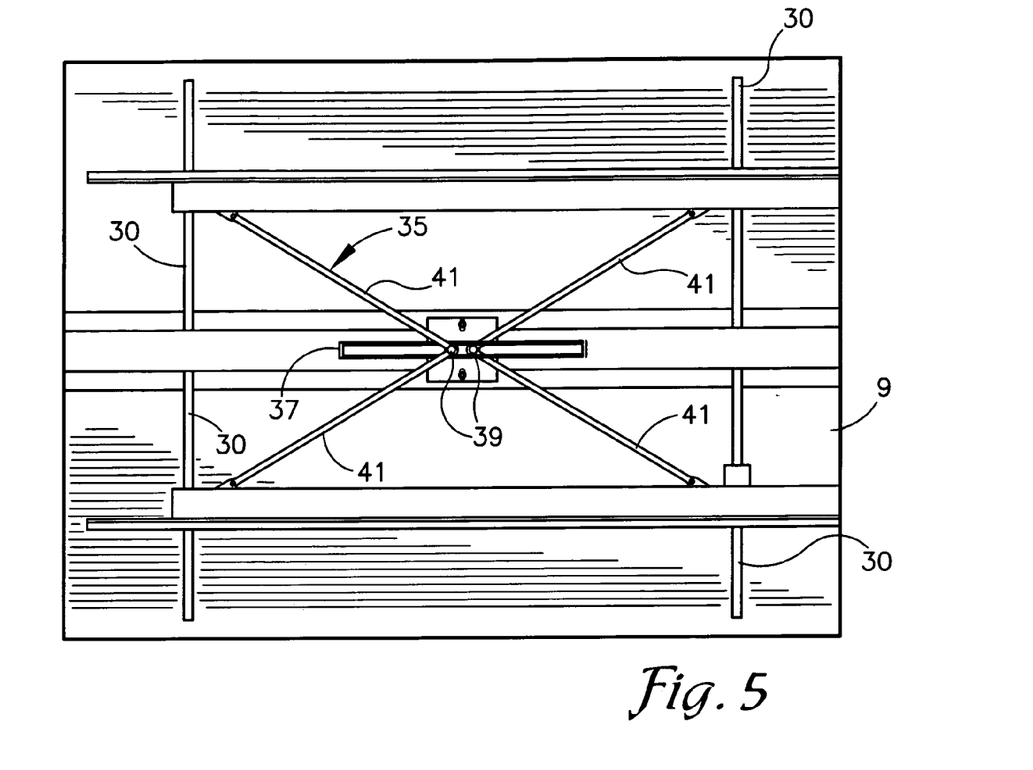
FIG. 5 is a bottom plan view of a roof panel of the cover mechanism and illustrates details of a centering linkage of the mechanism.
Figure 6:
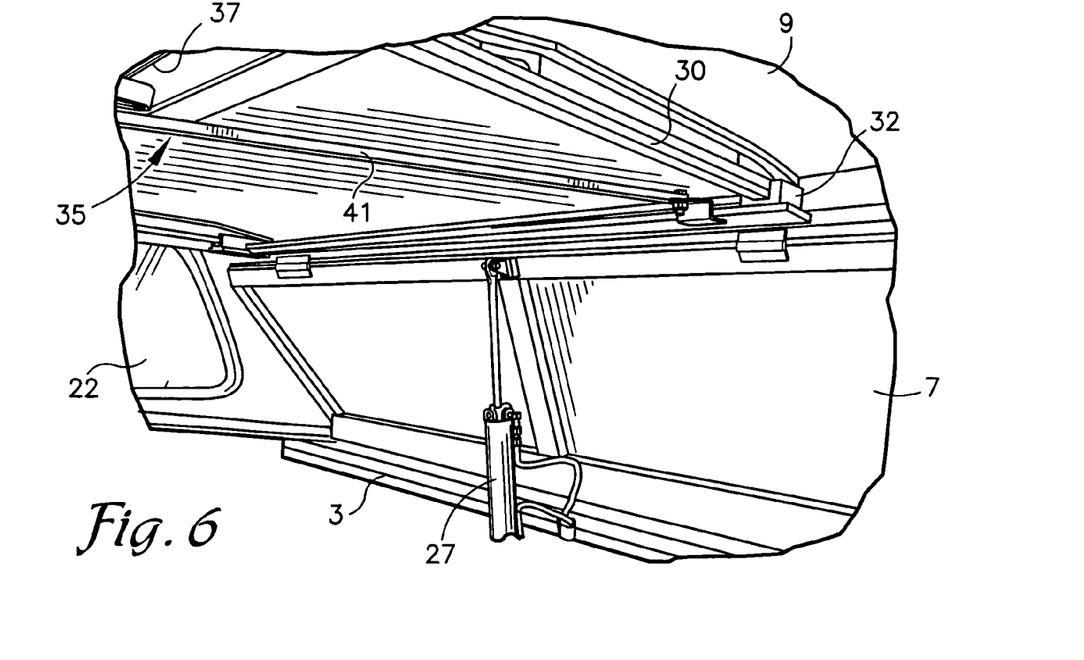
FIG. 6 is a fragmentary perspective view of the inside of a right side panel and shows details of a transverse guide rail and follower of the mechanism.

Referring to FIG. 5, the roof panel 9 is provided with front and rear sets of left and right transversely oriented guide rails 30. Each of the side panels 7 has front and rear guide followers 32 (FIG. 6) which are pivotally connected to their side panels 7 and which slidingly engage a respective one of the guide rails 30. Additionally, the roof panel 9 includes a centering linkage assembly 35 including a centrally positioned centering guide rail 37 which extends in a front-to-back, or longitudinal, orientation. Front and rear centering slides 39 slidingly engage the rail 37. Front and rear sets of left and right pairs of centering links 41 are pivotally connected respectively between the side panels 7, for example to the guide followers 32, and associated ones of the centering slides 39.

Figure 7:
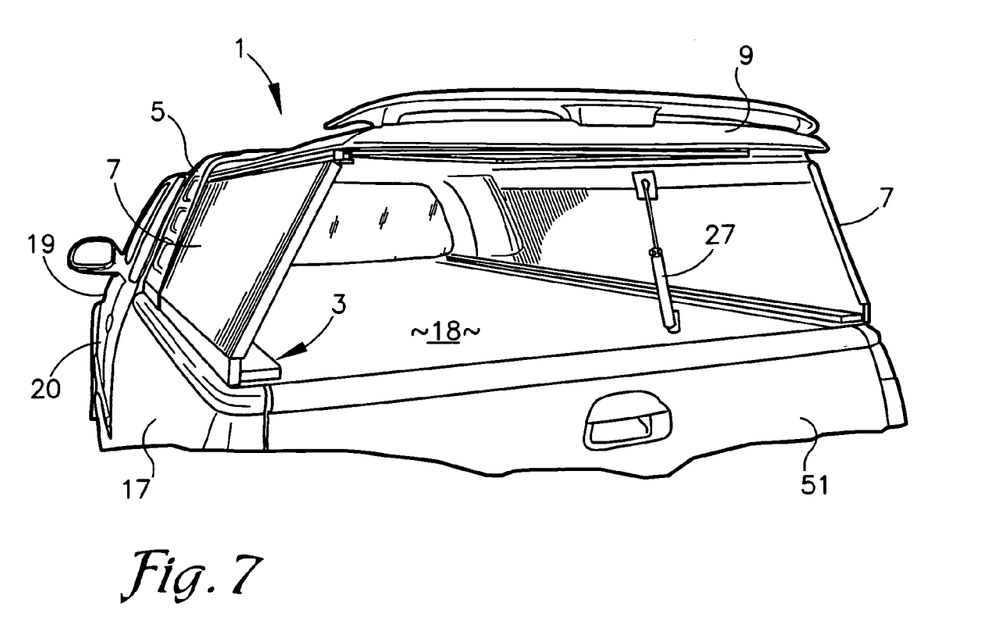
FIG. 7 is a fragmentary rear perspective view of the cover mechanism and illustrates the mechanism in a stage of conversion somewhat below the fully extended shell configuration.
Figure 8:
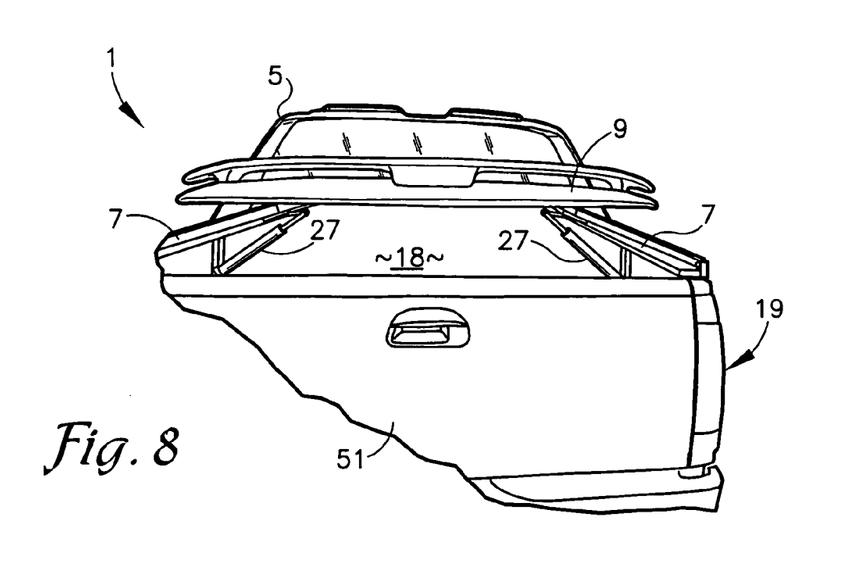
FIG. 8 is a view similar to FIG. 7 and illustrates the cover mechanism in a stage of conversion somewhat above the fully retracted tonneau configuration.

When the side panels 7 are pivoted downward and inward by the cylinders 27, the followers 32 slide along the rails 30 and draw the roof panel 9 down toward the tonneau configuration. Conversely, pivoting the side panels 7 upward and outward causes the roof panel 9 to be raised toward the shell configuration. The components of the centering linkage assembly 35 cooperate to retain the roof panel 9 centered over the pickup bed 18 during conversion of the cover mechanism 1 between its shell and tonneau configurations. FIG. 7 illustrates the cover mechanism 1 at a stage of conversion just below the fully raised shell configuration. FIG. 8 illustrates the mechanism 1 at a stage of conversion just above the fully lowered tonneau configuration.

Referring to FIG. 9, the rear hatch assembly 11 includes a rear hatch frame 45 which is pivotally connected to the roof panel 9, as by internal hinge members 47, which enable the frame 45 to pivot inwardly toward the front of the pickup truck 19. Hatch cylinders 49, such as hydraulic cylinders, are pivotally connected between the rear hatch frame 45 and the roof panel 9 and enable the frame 45 to be pivoted between an extended vertical position above a tailgate 51 of the truck 19 in the shell configuration of the cover mechanism 1 and a retracted horizontal position beneath the roof panel 9 in the tonneau configuration. Preferably, the hatch cylinders 49 and side panel cylinders 27 are coordinated in such a manner that the rear hatch frame 45 is raised to its horizontal position prior to retraction of the side panels 7 for conversion to the tonneau configuration and lowered to the vertical position after the side panels 7 have been extended to the shell configuration. A rear hatch panel 53 is pivotally connected to the rear hatch frame 45 by hinge members 55 and may be opened to the rear of the truck 19 or locked in a closed position.

The side panels 7 and rear hatch panel 53 are preferably provided with transparent or tinted window panes (not shown). Similarly, the roof panel 9 may be provided with a transparent or tinted pane to illuminate the interior of the bed in either configuration of the cover mechanism 1 and to provide increased driving visibility in the shell configuration of the mechanism 1.

Figure 11:
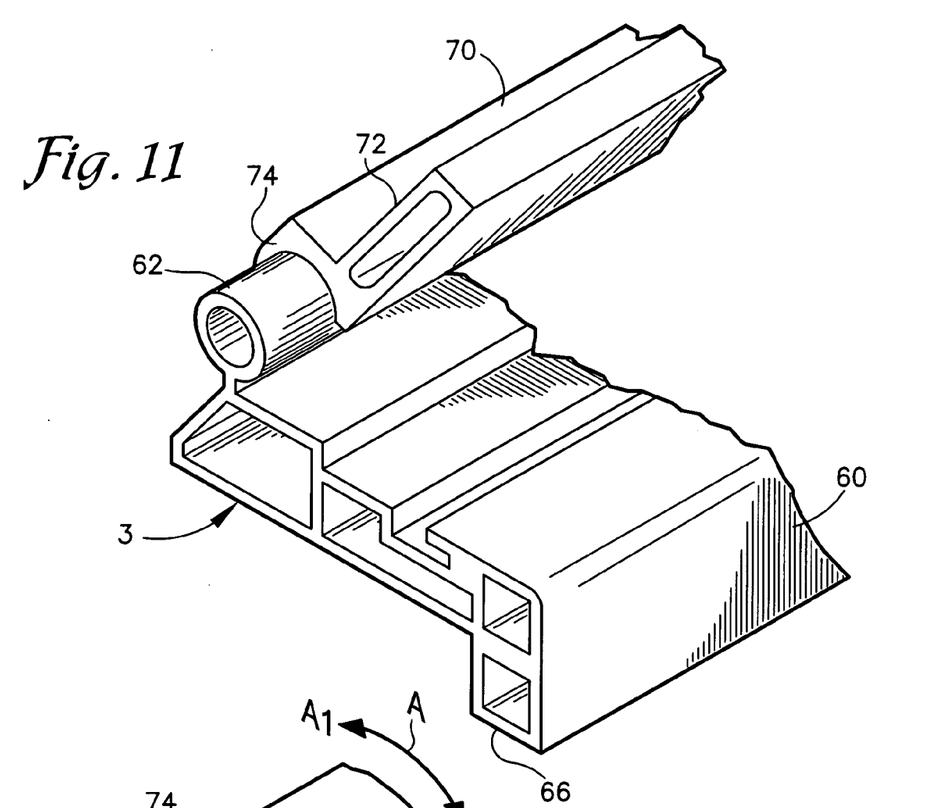
FIG. 11 is an enlarged fragmentary perspective view of members of a mounting frame of the convertible pickup bed cover with the frame members shown pivoted to a position below the shell configuration.
Figure 12:
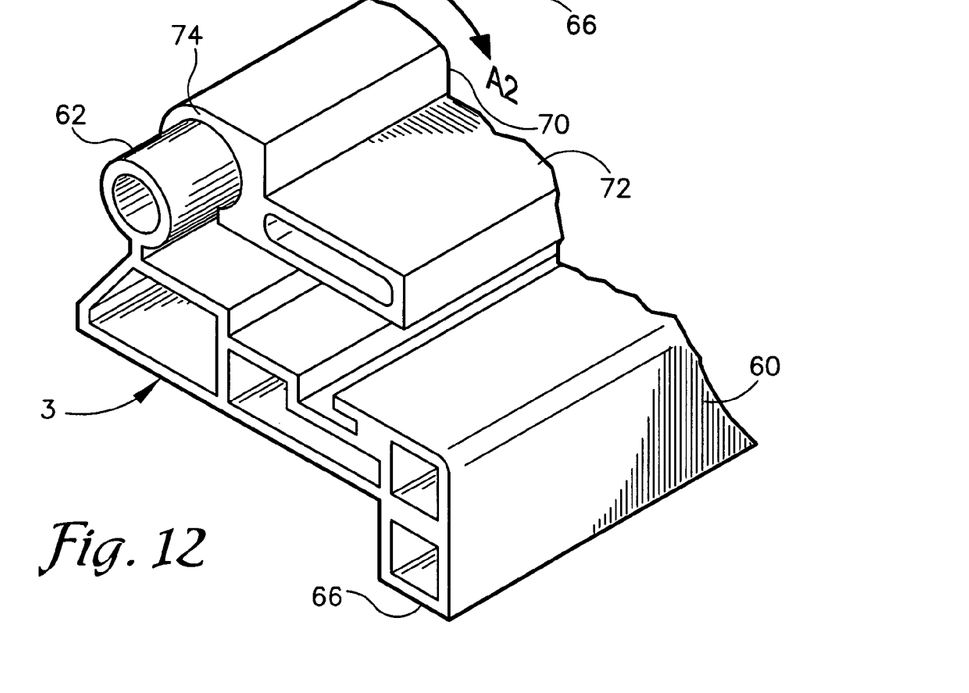
FIG. 12 is a view similar to FIG. 11 and shows the frame members pivoted to the tonneau configuration.

Referring now to FIGS. 11 and 12, the construction of the side rail is shown. The side rail 60 is to be mounted on the top edge of the left and right side walls of the truck bed side walls to permit a structure to seal the connection between the cover mechanism of the present invention and the existing truck side walls, and also to provide a bearing or pivot 62 which can receive the cover side wall connecting rail shown in FIGS. 12 and 13 to allow pivoting movement of the cover side walls or panels 7 with respect to the existing truck bed side walls 17. Side rail 60 rests atop truck bed side walls 17 by placing bottom horizontal edge 66 of side rail 60 onto the top surface of truck bed side wall 17. While a sealing compound may be used between bottom horizontal edge 66 and truck bed side wall 17, in a preferred embodiment, the material used to construct side rail 60, which may be a plastic or metal with a plastic bearing pad, may be sufficiently valuable as to provide a seal between truck bed side wall 17 and bottom horizontal edge 66.

Figure 13:
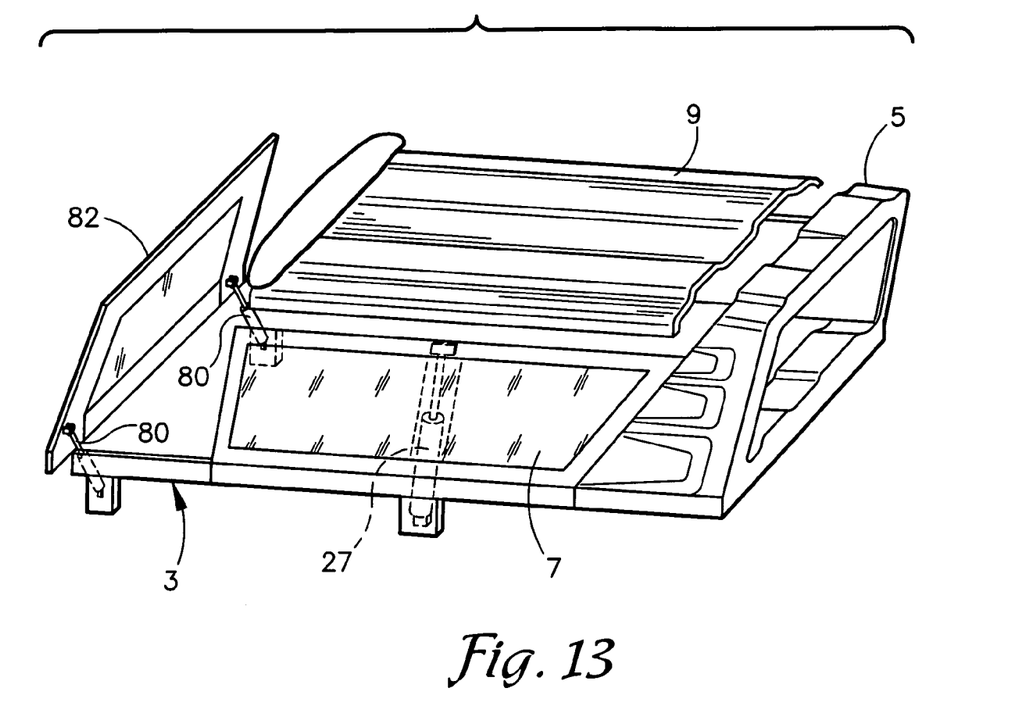
FIG. 13 is a fragmentary exploded perspective view showing an alternative embodiment of actuating mechanisms which can be used with the rear side wall for raising and lowering of the rear side wall.

Referring now to FIGS. 12 and 13, cover side wall connecting rail 70 is shown in perspective view. Flange 72 of cover side wall connecting rail 70 interconnects with the cover side wall structure 7, and socket rail 74 connects with pivot or ball rail 62 of side rail 60 to provide pivoting movement between the cover side wall and the side rail 60 connected to truck bed side walls 17. Cover side wall connecting rail 70 is shown in cross section view in FIG. 13 wherein socket rail 74 may be better appreciated.

Referring now to FIG. 12, the interconnection between side rail 60 and cover side wall connecting rail 70 is shown. It will be appreciated that movement of socket rail 74 in the direction shown by arrow A will correspond to the raising and lowering positions or the movement of the cover side wall 7 between a raised position wherein socket rail 74 is moved in the direction of arrow A toward end A1 of arrow A. When it is desired that cover side wall 7 which is attached to socket rail 74 be placed in the lowered or collapsed position to place cover or roof panel 9 in a lowered position, socket rail 74 will be moved along arrow A toward position A2, thereby placing cover side walls in a lowered position. FIGS. 11 and 12 shows a cross section view of the interconnection between side rail 60 and cover side wall connecting rail 70.

FIG. 13 shows a general perspective view in exploded form of the present invention and showing in particular an alternative embodiment of the application of pneumatic or hydraulic cylinders 80 to end wall 82. It will be appreciated that cylinders 80 may be manual pneumatic cylinders which are used to support end wall 82, or these may be cylinders which are actuated by the same mechanism as the cover side walls thus providing remotely actuated raising and lowering of end panel 82. The end wall 82 may be constructed in a manner similar to the rear hatch assembly 11, including a frame supporting a hatch member which can be manually opened and closed.

Figure 10:
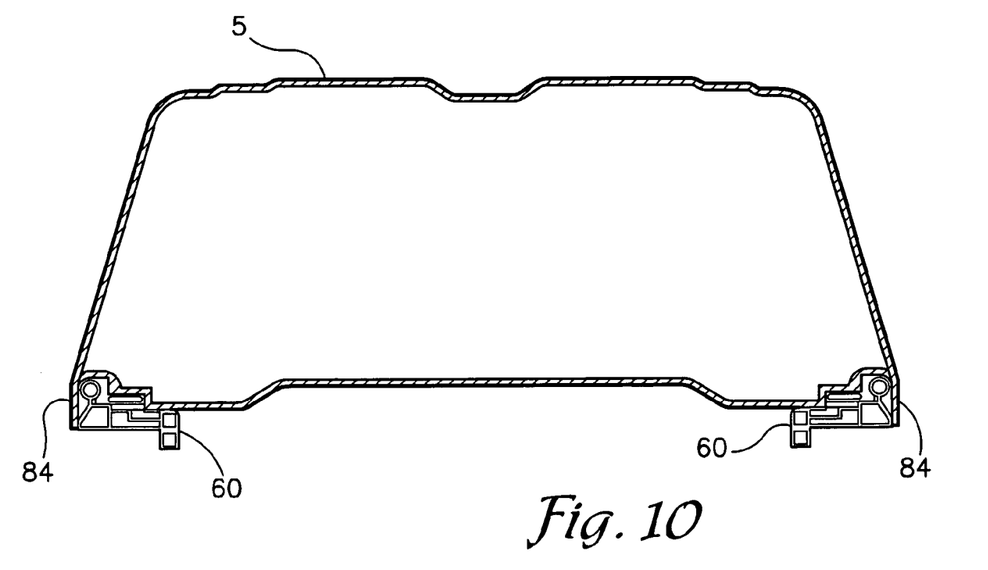
FIG. 10 is a cross section view showing the mounting of the cab extension or the forward cowling onto the side rail.

Referring now to FIG. 10, the interconnection between cab extension or cowling 5 and side rail 60 is shown. In FIG. 10, the manner in which cab extension 5 rests atop side rail 60 is shown with cab extension flanges 84 extending downwardly to cover the outside edges of side rail 60 and to meet with truck bed side wall 17.

It is to be understood that while certain forms of the present invention have been described and illustrated herein, it is not to be limited to the specific forms or arrangements of parts described and shown. For example, while the cylinders 27 and 49 are described as hydraulic cylinders, they could alternatively be pneumatic cylinders or replaced entirely by electrical motors, jackscrews, or other actuator devices which would occur to one skilled in the art.

Certain changes may be made in embodying the above invention and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive convertible camper shell and hard tonneau is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention, which, as a matter of language, might be said to fall therebetween.

Having thus described the invention, what is claimed as new and desired to be secured by Letters Patent is as follows:

1. A truck bed cover mechanism moveable between a raised position in which a cover top and sidewalls are, generally, above the top edge of the truck bed sidewalk and a lowered position in which the cover top and sidewalls are, generally, at the level of the top of the truck bed sidewalls, the cover mechanism comprising:

a cover top, left and right cover sidewalk operably connected with said cover top for generally simultaneous movement of said cover top with said cover sidewalls and said cover sidewalls being pivotally connected to the truck bed sidewalls, a guide for directing the path of movement of said sidewalls between the raised position and the lowered position, and left and right actuators for raising and lowering said cover mechanism, said actuators being connected between each of said truck bed sidewalls and the said pivotally connected cover sidewalls to generally simultaneous urge said cover sidewalls between a generally vertical, raised position and a generally horizontal lowered position.

2. The truck bed cover mechanism as claimed in claim 1 wherein said guide comprises:

a centering guide connected to said left and right cover sidewalls to maintain said cover top in a generally centered position during sidewall movement;

front and rear transverse guides attached to said cover top; and front and rear transverse guide followers connecting said cover sidewalls to said front and rear transverse guides.

3. The truck bed cover mechanism as claimed in claim 1 further comprising a forward cowling spaced outwardly from said cover top and cover sidewalls and attached to said truck bed sidewalls.

4. The truck bed cover mechanism as claimed in claim 1 further comprising a back wall moveable between a lowered position and a raised position.

5. The truck bed cover mechanism as claimed in claim 4 wherein said back wall is manually raised and lowered.

6. The truck bed cover mechanism as claimed in claim 1 further comprising windows in said cover sidewalls.

7. The truck bed cover mechanism as claimed in claim 4 wherein said left and right actuators are pneumatic cylinders.

8. The truck bed cover mechanism as claimed in claim 4 wherein said left and right actuators are hydraulic cylinders.

9. The truck bed cover mechanism as claimed in claim 4 wherein said left and right actuators are screw drive mechanisms.

10. A truck bed cover mechanism for covering a bed of a pickup truck and movable between a lowered tonneau configuration and a raised shell configuration, said bed including sidewalls and a rear tailgate, and said mechanism comprising:
   (a) a pair of rigid side panels hingedly connected to respective sidewalls of said bed of a said pickup truck;
   (b) a side panel motor engaged with said side panels and operable to pivot said side panels inwardly to substantially horizontal positions and outwardly to substantially upright positions;
   (c) a rigid roof panel positioned in covering relation to said bed; and
   (d) a guide mechanism connecting said side panels to said roof panel in such a manner as to lower said roof panel to said tonneau configuration when said side panels are generally simultaneously pivoted to said substantially horizontal positions and to raise said roof panel to said shell configuration when said side panels are generally simultaneously pivoted toward said substantially upright positions.

11. A mechanism as set forth in claim 10 and including:
   (a) a rear hatch panel hingedly connected to said mechanism at a rear end thereof, said hatch panel including a hatch frame with a hatch member hingedly connected thereto to enable said hatch member to be selectively opened and closed; and
   (b) a hatch motor engaged with said hatch panel and operable to retract said hatch panel to a substantially horizontal panel for said tonneau configuration and to extend said hatch panel to a substantially vertical position for said shell configuration.

12. A mechanism as set forth in claim 11 and including:
   (a) a cab extension positioned at a forward end of said bed opposite said tailgate, said cab extension being an inverted U-shaped member and being connected to said sidewalls of said bed.

13. A truck bed cover mechanism for covering a bed of a pickup truck and movable between a lowered tonneau configuration and a raised shell configuration, said bed including sidewalls and a rear tailgate, and said mechanism comprising:
   (a) a pair of rigid side panels, each panel being hingedly connected to a respective sidewall of said bed of said pickup truck, each side panel including a guide follower;
   (b) a rigid roof panel having an elongated guide member positioned in transversely extending relation on a lower surface thereof, said roof panel being positioned in covering relation to said bed with said guide member guidingly engaged by the guide followers of said side panels; and
   (c) a side panel motor engaged with said side panels in such a manner as to generally simultaneously pivot said side panels inwardly thereby lowering said roof panel to said tonneau configuration and conversely to generally simultaneously pivot said side panels outwardly to thereby raise said roof panel to said shell configuration.

14. A mechanism as set forth in claim 13 and including:
   (a) a rear hatch panel hingedly connected at a top end thereof to a lower surface of said roof panel at a rear end thereof; and
   (b) a hatch motor engaged with said hatch panel and operable to retract said hatch panel to a substantially horizontal panel for said tonneau configuration and to extend said hatch panel to a substantially vertical position for said shell configuration.

15. A mechanism as set forth in claim 14 and including:
   (a) said hatch panel including a hatch frame with a hatch member hingedly connected thereto to enable said hatch member to be selectively opened and closed.

16. A mechanism as set forth in claim 13 and including:
   (a) a cab extension positioned at a forward end of said bed opposite said tailgate, said cab extension being an inverted U-shaped member and being connected to said sidewalls of said bed.

17. A mechanism as set forth in claim 13 wherein said guide member includes:
   (a) an elongated transverse front guide member and an elongated rear transverse guide member, said front and rear guide members being positioned on said lower surface of said roof panel; and
   (b) each of said side panels including a front guide follower engaging said front guide member and a rear guide follower engaging said rear guide member.

18. A mechanism as set forth in claim 17 wherein:
   (a) each of said front and rear guide members includes a respective left guide segment and a right guide segment;
   (b) said side panels include a left side panel and a right side panel; and
   (c) guide followers of said left side panel engage the left guide segments and guide followers of said right side panel engage the right guide segments.

19. A mechanism as set forth in claim 17 and including:
   (a) a centering mechanism engaged among said roof panel and said side panels and operative to maintain said roof panel in covering relation to said bed during movement thereof between said tonneau configuration and said shell configuration and vice versa.

20. A mechanism as set forth in claim 17 and including:
   (a) an elongated center guide member extending perpendicular to said front and rear guide members along a center line of said roof panel on said lower surface thereof;
   (b) a front center slide and a rear center slide engaged with said center guide member;
   (c) a respective front center link connected between said front center slide and a respective one of the front guide followers;
   (d) a respective rear center link connected between said front center slide and a respective one of the rear guide followers; and
   (e) said center guide member, said center slides, and said center links cooperating to maintain said roof panel in covering relation to said bed during movement thereof between said tonneau configuration and said shell configuration and vice versa.

21. A truck bed cover mechanism for covering a bed of a pickup truck and movable between a lowered tonneau configuration and a raised shell configuration, said bed including sidewalls and a rear tailgate, and said mechanism comprising:
   (a) a pair of rigid side panels, each panel being hingedly connected to a respective sidewall of said bed of a pickup truck, each side panel including a front guide follower and a rear guide follower;
   (b) a rigid roof panel positioned in covering relationship to said bed and including an elongated transverse front guide member and an elongated rear transverse guide member, said front and rear guide members being positioned in spaced relation on said lower surface of said roof panel, said front and rear guide members guide member guidingly engaging the front and rear guide followers of said side panels;
   (c) a pair of side panel motors, each side panel motor engaged between one of said side panels and an associated sidewall of said bed, said side panel motors being operated in such a manner as to pivot said side panels inwardly thereby lowering said roof panel to said tonneau configuration and conversely to pivot said side panels outwardly to thereby raise said roof panel to said shell configuration;
   (d) a rear hatch panel hingedly connected at a top end thereof to a lower surface of said roof panel at a rear end thereof;
   (e) a hatch motor engaged with said hatch panel and operable to retract said hatch panel to a substantially horizontal panel for said tonneau configuration and to extend said hatch panel to a substantially vertical position for said shell configuration; and
   (f) a cab extension positioned at a forward end of said bed opposite said tailgate, said cab extension being an inverted U-shaped member and being connected to said sidewalls of said bed.

22. A mechanism as set forth in claim 21 and including:
   (a) said hatch panel including a hatch frame with a hatch member hingedly connected thereto to enable said hatch member to be selectively opened and closed.

23. A mechanism as set forth in claim 21 wherein:
   (a) each of said front and rear guide members includes a respective left guide segment and a right guide segment;
   (b) said side panels include a left side panel and a right side panel; and
   (c) guide followers of said left side panel engage the left guide segments and guide followers of said right side panel engage the right guide segments.

24. A mechanism as set forth in claim 21 and including:
   (a) a centering mechanism engaged among said roof panel and said side panels and operative to maintain said roof panel in covering relation to said bed during movement thereof between said tonneau configuration and said shell configuration and vice versa.

25. A mechanism as set forth in claim 21 and including:
   (a) an elongated center guide member extending perpendicular to said front and rear guide members along a center line of said roof panel on said lower surface thereof;
   (b) a front center slide and a rear center slide engaged with said center guide member;
   (c) a respective front center link connected between said front center slide and a respective one of the front guide followers;
   (d) a respective rear center link connected between said front center slide and a respective one of the rear guide followers; and
   (e) said center guide member, said center slides, and said center links cooperating to maintain said roof panel in covering relation to said bed during movement thereof between said tonneau configuration and said shell configuration and vice versa.

* * * * *

UNITED STATES PATENT AND TRADEMARK OFFICE
CERTIFICATE OF CORRECTION

PATENT NO. : 7,243,965 B2
APPLICATION NO. : 11/183497
DATED : July 17, 2007
INVENTOR(S) : James King et al.

It is certified that error appears in the above-identified patent and that said Letters Patent is hereby corrected as shown below:

In Claim 1, Column 6, Line 38 correct the word "sidewalk" after the words "truck bed" to --sidewalls--;

In Claim 1, Column 6, Line 43 correct the word "sidewalk" after the word "cover" to --sidewalls--;

In Claim 1, Column 6, Line 54 change the word "the" after the word "and" to --a--;

In Claim 10(a), Column 7, Line 25, delete the word "a" after the words "bed of."

Signed and Sealed this

Eighteenth Day of September, 2007

JON W. DUDAS
*Director of the United States Patent and Trademark Office*